Oct. 13, 1964 M. S. SHEBANOW 3,152,827

MANUAL GRIPPING TOOL

Filed June 1, 1962

INVENTOR
MICHAEL S. SHEBANOW

BY

C. Norman Hubbard

ATTORNEY

United States Patent Office 3,152,827
Patented Oct. 13, 1964

3,152,827

MANUAL GRIPPING TOOL

Michael S. Shebanow, Pelham Manor, N.Y., assignor to Sperry Rand Corporation, New York, N.Y., a corporation of Delaware Filed June 1, 1962, Ser. No. 199,447
9 Claims. (Cl. 294—16)

This invention relates generally, to manually operated tools and has a more particular relation to a tool designed to grip and thereby facilitate the handling of flat and relatively non-durable objects which in turn may support a plurality of fragile components which are subjected to damage or possible breakage if the object is improperly gripped or inadvertently dropped.

The invention is herein shown and disclosed in an embodiment particularly adapted for removing and inserting printed circuit boards or cards out of or into a printed circuit connector assembly. A connector assembly, as is well known in the art, comprises a rack structure for supporting a plurality of individual printed circuit boards in a spaced-apart, stacked arrangement, the assembly including suitable means for connecting each board into an appropriate circuit and also including suitable guides whereby a circuit board, of which one edge may be exposed to enable insertion and removal of the board from the assembly, is directed into and supported in proper engagement with its respective connector means. Accordingly, the exposed edge and adjacent border area of the printed circuit card provides the only surface thereof which is available for gripping the card for removal or insertion purposes, and since this area is preferably as small as possible, in order to keep the size of the cards and likewise the size of the overall assembly as compact as possible, there has arisen the problem of physically handling the printed circuit boards during insertion and removal from the connector assembly without damage thereto either by gripping an improper area of the board, gripping it with excessive pressure, or gripping it with insufficient pressure permitting the board to be inadvertently dropped when it is removed from the assembly.

The device according to the present invention comprises a manually operated gripping mechanism which overcomes the aforementioned problem. One feature of the device resides in the shape of the handles which define a closed loop thereby minimizing the risk of dropping the device while in use. Another feature of the device resides in the shape and disposition of the gripping jaws which are designed to engage a substantial area of only the border surface of a circuit board and thereby avoiding the risk of taking too wide a bite on the circuit board which could damage circuit components contained on the board. Another feature of the device is the provision of spring means for biasing the jaws towards a closed position so as to maintain a grip on a circuit board even though manual pressure is inadvertently released, thereby avoiding the risk of inadvertently dropping a circuit board from the grip of the device. Another feature resides in the provision of means for controlling the spread of the gripping jaws to a predetermined extent, to prevent opening of the jaws a greater extent than is necessary to grip one printed circuit board, and for limiting the closure of said jaws at a point which will prevent damage to or abrasion of the circuit board regardless of the amount of manual pressure which may be exerted on the device.

It is, therefore, an object of the invention to minimize the risk in handling relatively thin sheet-like members of a fragile nature such as printed circuit boards.

It is a further object of the invention to provide a manually operated gripping device designed for minimizing the risk of inadvertently dropping the device or an object in the grip of the device.

It is a further object of the invention to provide a gripping device in which the gripping jaws have a controlled extent of opening and are prevented from fully closing.

Further objects of the invention, together with the features contributing thereto and the advantages accruing therefrom, will be apparent from the following description when read in conjunction with the drawing wherein.

Figure 2:
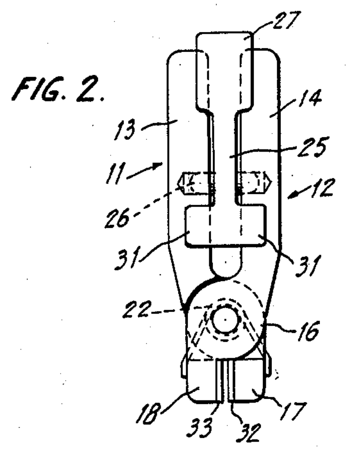
FIG. 2 is a front elevation of the device, showing the jaws when in their most closed position.

Referring now to the drawing, the device will be seen to comprise a pair of complementally arranged levers 11, 12, each of which is shaped to provide substantially retangular and open handles 13, 14 respectively, cylindrically shaped bearing portions 15, 16 respectively, and elongate gripping jaws 17, 18 respectively. The two bearing portions, 15, 16 of each lever are rotatably secured to a pivot pin 21 whereby, since each jaw is disposed in substantially diametrically opposed relation to its handle in scissors fashion, any force tending to open, i.e. separate, or close the handles by movement thereof about the pivot pin 21 will tend to cause a corresponding separation or closing of the gripping jaws 17, 18, respectively. A torsion spring 22, supported by the pivot pin 21, and having its ends bearing on the outer surfaces of the jaws 17, 18 tends to move the jaws to their closed position with a predetermined amount of force.

For operating said jaws and limiting the extent of closure of the jaws, a control lever 25 is provided, said control lever being pivotably mounted on a pivot pin 26 which is appropriately secured at one end in the forward shank of one of the handles and slide-fitted in a recessed portion in the forward end of the other one of the handles. The upper portion of the control lever 25 includes a button surface 27 which is conveniently disposed for operation by the thumb of an operator having a hand grasp of the device, the inner face of said button being wedge shaped to provide camming surfaces 28, 29 bearing on the inner surface of the handles 13, 14, respectively.

Figure 1:
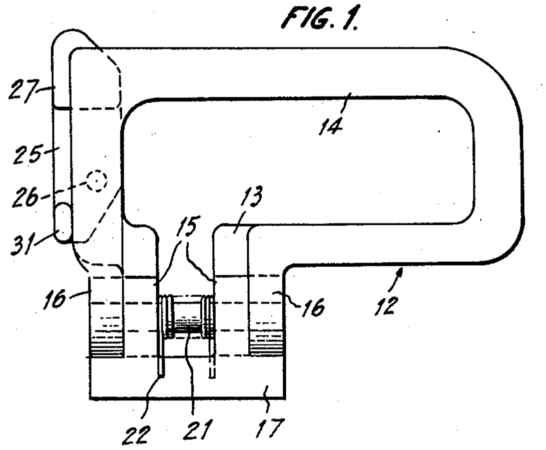
FIG. 1 is a side elevation of the device.

The lower portion of said control lever 25 is formed with ears 31 adapted to normally butt against the forward surface of the handles 13, 14 and thereby limit the counterclockwise rotation of the control lever 25 to the position shown in FIG. 1 to thereby effect a corresponding limit in the extent to which the jaws 17, 18 may close.

Figure 3:
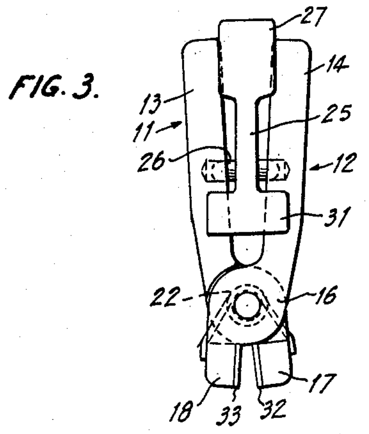
FIG. 3 is a front elevation of the device, showing the gripping jaws in their most open position.
Figure 4:
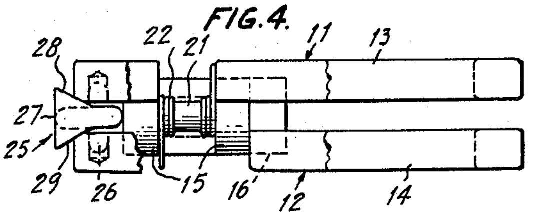
FIG. 4 is a plan view of the device.

FIG. 2 illustrates the parts in the normal position wherein they are limited by the ears 31 at a point of minimum separation. FIG. 3 illustrates the position of the parts when actuated by manual depression of the control lever button 27 to cause, by the camming action of the cam surfaces 28, 29, separation of the handles and a corresponding separation of the jaws 17, 18 to their position of maximum separation.

The amount of minimum separation is predetermined in accordance with the thickness of the articles with which the device is to be used, i.e. in the present instance printed circuit boards, and is arrived at by providing slightly less clearance between the jaws than the thickness of the printed circuit boards so that, regardless of the amount of force exerted manually on the handles 13, 14, the jaws can nevertheless be closed to a point which would crush the surface of the printed circuit board. Preferably, the jaws 17, 18 are lined strips of compressible material 32, 33 having a high coefficient of friction, such as soft rubber or the like, so as to minimize slippage and to avoid abrasion to the surface of the article being gripped. The degree of maximum separation of the jaws is predetermined in accordance with the normal spacing of printed circuit boards in a connector assembly so as to prevent the jaws from being opened more than is necessary to easily embrace the border area of the board to be removed or to a point where the jaws would encounter interference from the adjacent printed circuit boards of an assembly as the device is being inserted to grip the particular printed circuit board which it is desired to remove.

Figures 5, 6:
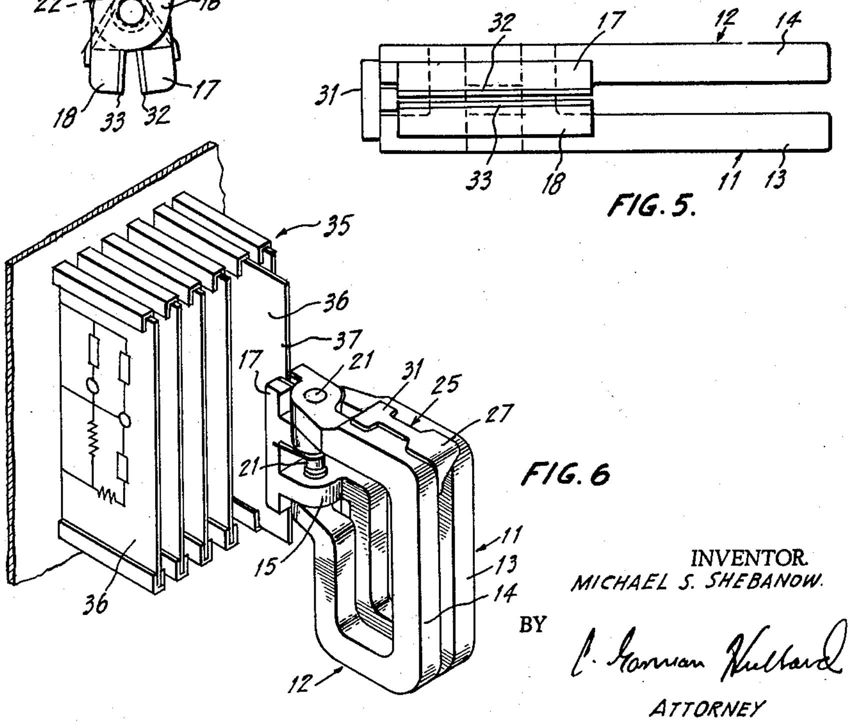
FIG. 5 is a bottom view of the device.
FIG. 6 illustrates the use of the device in removing a printed circuit board from a connector assembly.

FIG. 6 illustrates the manner in which the device is used to remove a printed circuit board from a connector assembly 35. With the device in the grasp of the operator's hand, with the fingers projecting through the open interior area of the looped handles, the thumb is pressed against the control lever button 27 which operates to cam the handles and the jaws apart against the tension of torsion spring 22, thereby causing the jaws to open up a sufficient extent to embrace the border area of one of the printed circuit boards 36 of the connector assembly. It will be noted that each of the printed circuit boards has only a relatively narrow border area 37 which is exposed and devoid of circuitry or circuit components, and due to the shape of the jaws 17, 18 which are disposed immediately adjacent the bearing portions 15, 16 of the device, it is not possible for the jaws to grab any further into the surface area of the card or board than the limit of the border area, and since the jaws extend longitudinally a substantial distance, they are able to engage a corresponding substantial area of the border surface of the printed circuit board. The predetermined extent of the separation of the jaws prevents the jaws from being opened to a point where they would strike against the surface of adjacent circuit boards in the assembly as the device is being inserted to grip a selected one of the boards.

Once the selected board has been gripped, pressure is released from the contorl lever button 27 and manual force is exerted on the handles 13, 14 to affect a snug grip on the border of the printed circuit board whereby the board may be slid out of the connector assembly. Once the board has been removed from the connector assembly, it will remain in the grip of the device due to the force exerted by the torsion spring 22, even though manual pressure on the handles 13, 14 may be released, the force of the spring 22 being predetermined so as to maintain gripping contact with a printed circuit board under such circumstances. It will be apparent that this feature avoids inadvertent dropping of the printed circuit board out of the grip of the device in the event that manual pressure is inadvertently released from the handles before the printed circuit board is deposited at its desired destination. When it is desired to disengage the printed circuit board from the grip of the device, the control lever button 27 is again depressed by the thumb of the operator, whereupon the jaws 17, 18 are again separated by the camming action of the control lever 25. To insert a printed circuit board into the connector assembly, of course, a procedure reverse to that just above described would be followed.

From the foregoing, it will be apparent that the device affords a convenient and easily operated mechanism for handling thin, fragile objects, such as printed circuit boards, with minimum risk of damage to the board as a result of carelessness or accidental handling of the boards.

While there has been shown and described what is considered a preferred embodiment of the invention, it will of course be apparent that changes in form can be made without departing from the spirit of the invention, and it is therefore intended that the invention be not limited to the exact form herein shown and described nor to anything less than the whole of the invention as hereinabove set forth and as hereinafter claimed.

What is claimed and desired to be secured by Letters Patent is:

1. A manually operable gripping tool comprising, (*a*) a pair of levers pivotally joined to each other in scissors fashion and each shaped to provide diametrically opposed and complemental handle and jaw portions, said jaw portions being urged towards the closed position under the influence of a force tending to move said handle portions towards a closed position, (*b*) means biasing said jaw portions towards the closed position, (*c*) and control means movable with respect to and cooperating with said handle portions for limiting the degree of closure of said jaw portions, said control means being manually operable for separating said jaw portions a predetermined extent against the resistance of said biasing means.

2. A manually operable gripping tool comprising, (*a*) a pair of levers pivotably joined to each other in scissors fashion and each shaped to provide diametrically opposed and complemental handle and jaw portions, each said handle portion being substantially rectangular in outline and defining in conjunction with the pivotal axis thereof a closed loop, said jaw portions and said handle portions being simultaneously rotatable towards closed and separated positions, respectively, (*b*) a torsion spring mounted about the pivotal axis of said members and arranged with its free ends bearing on said jaw portions for urging said jaw portions towards a closed position, and (*c*) a control lever pivotally supported by said handle portions and manually rotatable in one direction for separating said jaw portions against the resistance of said spring means, said control lever being formed with camming surfaces adapted to bear on said handle portions when the lever is rotated in said one direction to effect the separation of said jaw portions, said lever including at the other end thereof limit ears normally abutting said handle portions for limiting the rotation of said lever in the opposite direction under the influence of said spring means, whereby said jaw portions are limited at a corresponding position of minimum separation.

3. The invention according to claim 2 wherein the gripping faces of said jaw portons are lined with compressible material having a high coefficient of friction.

4. A manually operable gripping tool comprising:

(*a*) a pair of levers pivotally jointed to each other in scissors fashion and each shaped to provide diametrically opposed and complemental handle and jaw portions, said jaw portions being urged towards the closed position under the influence of a force tending to move said handle portions towards a closed position, (*b*) means biasing said jaw portions towards the closed position, (*c*) and control means cooperating with said handle portions for limiting the degree of closure of said jaw portions, said control means being manually operable for separating said jaw portions a predetermined extent against the resistance of said biasing means, (*d*) said control means comprising a lever pivotably supported by said handle portions and manually rotatable in one direction for separating said jaw portions against the resistance of said biasing means.

5. The invention according to claim 4 wherein said control lever is formed at one end thereof with camming surfaces adapted to bear on said handle portions when rotated in said one direction for effecting the separation of said jaw portions.

6. The invention according to claim 5 wherein the other end of said control lever is formed with limit ears normally abutting said handle portions for limiting the rotation of the said control lever in the opposite direction under the influence of said biasing means, whereby said jaw portions are limited at a corresponding position of minimum separation.

7. A manually operable gripping tool comprising:

(*a*) a pair of levers pivotally joined to each other in scissors fashion and each shaped to provide diametrically opposed and complemental handle and jaw portions, said jaw portions being urged towards the closed position under the influence of a force tending to move said handle portions towards a closed position, (*b*) means biasing said jaw portions towards the closed position, (*c*) and control means movable with respect to and cooperating with said handle portions for limiting the degree of closure of said jaw portions, said control means being manually operable for separating said jaw portions a predetermined extent against the resistance of said biasing means, (*d*) said biasing means comprising a torsion spring mounted about the pivotal axis of said members and arranged with its free ends bearing on said jaw portions.

8. A manually operable gripping tool comprising:

(*a*) a pair of levers pivotally joined to each other in scissors fashion and each shaped to provide diametrically opposed and complemental handle and jaw portions, said jaw portions being urged towards the closed position under the influence of a force tending to move said handle portions towards a closed position, (*b*) means biasing said jaw portions towards the closed position, (*c*) and control means movable with respect to and cooperating with said handle portions for limiting the degree of closure of said jaw portions, said control means being manually operable for separating said jaw portions a predetermined extent against the resistance of said biasing means, (*d*) each handle portion being substantially rectangular in outline and defining in conjunction with the pivotal axis thereof a closed loop adapted to surround the palm of the user of the device.

9. A manually operable gripping tool comprising:

(*a*) a pair of levers pivotally joined to each other in scissors fashion and each shaped to provide diametrically opposed and complemental handle and jaw portions, said jaw portions being urged towards the closed position under the influence of a force tending to move said handle portions towards a closed position, (*b*) means biasing said jaw portions towards the closed position, (*c*) and control means movable with respect to and cooperating with said handle portions for limiting the degree of closure of said jaw portions, said control means being manually operable for separating said jaw portions a predetermined extent against the resistance of said biasing means, (*d*) each said handle terminating in spaced apart bearing portions which define the pivotal axis for said handles, each said jaw portion lying adjacent said bearing portions and longitudinally spanning a distance coextensive with the space between said bearing portions, whereby the device is restricted for contact engagement with only a corresponding longitudinal border area of an object gripped by the device.

References Cited in the file of this patent

UNITED STATES PATENTS 908,947 Burkhart ............... Jan. 5, 1909